United States Patent [19]

Yamamoto et al.

[11] Patent Number: 5,032,220
[45] Date of Patent: Jul. 16, 1991

[54] MANUFACTURING METHOD OF FREQUENCY DOUBLER

[75] Inventors: Kazuhisa Yamamoto, Settu; Shigeru Ohmori, Osaka; Tetsuo Taniuchi, Kobe, all of Japan

[73] Assignee: Matsushita Electric Industrial Co., Ltd., Osaka, Japan

[21] Appl. No.: 477,768

[22] Filed: Feb. 9, 1990

[30] Foreign Application Priority Data

Feb. 9, 1989 [JP] Japan ................................. 1-30551

[51] Int. Cl.⁵ ..................... B44C 1/22; C03C 15/00; C03C 25/06; C23F 1/02
[52] U.S. Cl. ................................. 156/643; 156/646; 156/656; 156/659.1; 156/667; 430/321
[58] Field of Search .............. 156/643, 646, 655, 656, 156/659.1, 667; 204/192.32, 192.35; 350/96.12, 96.3; 430/321

[56] References Cited

U.S. PATENT DOCUMENTS

4,547,262 10/1985 Spillman et al. ................. 156/656 X
4,701,008 10/1987 Richard et al. ................... 156/655 X

*Primary Examiner*—William A. Powell
*Attorney, Agent, or Firm*—Wenderoth, Lind & Ponack

[57] ABSTRACT

When fabricating an optical wavelength by proton exchange method on a substrate of $LiNb_xTa_{1-x}O_3$ ($0 \leq x \leq 1$), by using $Ta_2O_5$ as the protective mask, the edge of the mask becomes smooth and diffusion of impurity from the protective mask into the substrate does not occur during heat treatment, and the propagation loss may be notably reduced. As a result, the efficiency of the frequency doubler may be enhanced.

9 Claims, 6 Drawing Sheets

MANUFACTURING METHOD OF FREQUENCY DOUBLER

BACKGROUND OF THE INVENTION

This invention relates to a manufacturing method of a frequency doubler (optical harmonic generating device) used in the field of optical information processing utilizing coherent light or in the field of measurement control applying light.

Figure 6A:
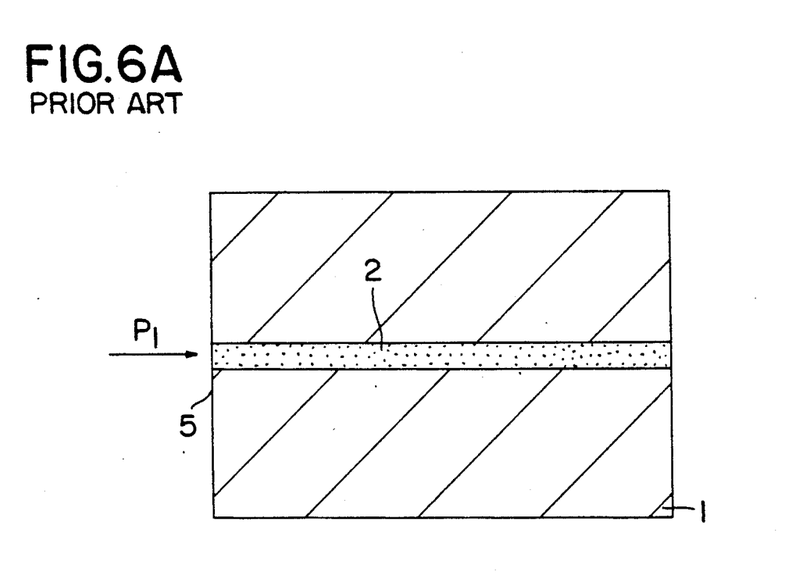
FIGS. 6A, 6B are plan view and sectional view of a conventional optical harmonic generating device.
Figure 6B:
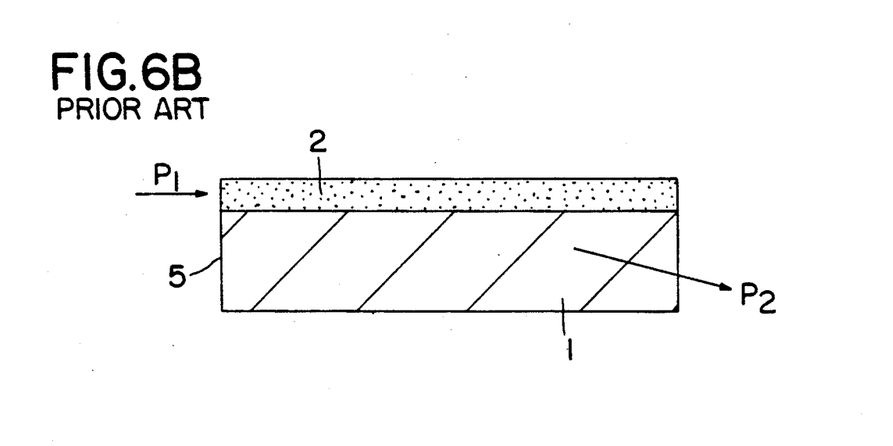

The structure of a conventional frequency doubler is shown in FIG. 6. Referring to this drawing, the optical harmonic generation (wavelength 0.42 μm) to the fundamental wave of 0.84 μm in wavelength using this frequency doubler is described in detail below. [See T. Taniuchi and K. Yamamoto, "Second harmonic generation by Cherenkov radiation in proton-exchanged $LiNbO_3$ optical waveguide" CLEO '86, WR3, 1986.] When the light of fundamental wave P1 from a laser diode enters an incident plane 5 of a buried optical waveguide 2 formed on an $LiNbO_3$ substrate 1, if the condition for equalizing the effective index N1 of the guided mode of the fundamental wave and the effective index N2 of the harmonic wave is satisfied, the light of the harmonic wave P2 is effectively emitted from the optical waveguide 2 into the $LiNbO_3$ substrate so as to operate as an optical harmonic generating device.

Figure 7A:
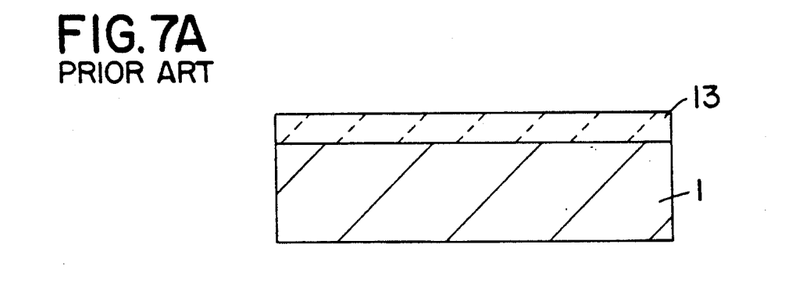
FIGS. 7A to 7C are manufacturing process drawings of a conventional optical waveguide.
Figure 7B:
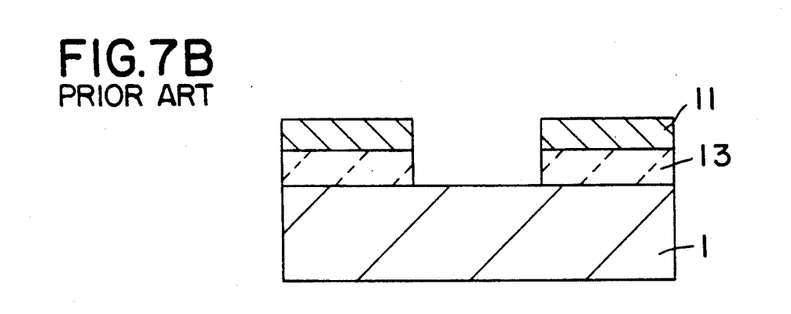
Figure 7C:
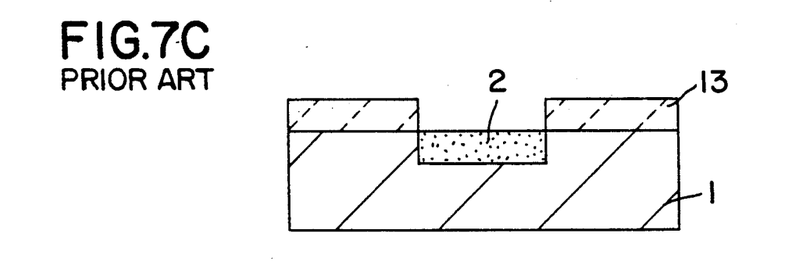

Such conventional optical harmonic generating device required a buried type optical waveguide as a fundamental constituent element. The method of fabricating this buried type optical waveguide is explained by reference to FIG. 7. In FIG. 7A, a Ta film 13 is evaporated on the $LiNbO_3$ substrate which is a ferroelectric crystal. In FIG. 7B, a slit of several micrometers in width is opened by photo process or etching using a photoresist 11. In FIG. 7C, heat treatment is effected in phosphoric acid to form a high refractive index layer (with the refractive index difference from the substrate of about $\Delta Ne = 0.14$) as the waveguide 2.

The optical harmonic generating device fabricated in this manner, when the fundamental wave P1 with wavelength of 0.84 um enters one end of the waveguide 2 and the harmonic wave P2 is emitted from the other end, presents the maximum conversion efficiency at the thickness of 0.4 μm of the waveguide with respect to the fundamental wave P1 of wavelength of 0.84 um from the laser diode, and a harmonic wave of P2=0.4 mW is obtained when the length of the waveguide is 6 mm and P1 is 40 mW. The conversion efficiency P1/P2 at this time is 1%. The propagation loss of this device is 1.5 dB/cm.

According to the research by the present inventors, in the optical harmonic generating device fabricated by using Ta mask as mentioned above, diffusion of Ta from the Ta mask to the $LiNbO_3$ occurs, and the loss of the optical waveguide caused by this is about 1.5 dB/cm, which made it difficult to enhance the efficiency. For example, if the length of the waveguide is increased five times from 6 mm to 30 mm, the conversion efficiency of the device is not five-folded because of the propagation loss, and is actually about 2.7 times. When a short wavelength laser source was composed of the optical harmonic generating device using Ta mask, it was difficult to increase the output owing to the same reasons. It was therefore difficult to obtain stably harmonic waves of over 1 mW which is the practical level of the short wavelength laser source

SUMMARY OF THE INVENTION

It is hence a primary object of the invention to present a frequency doubler capable of enhancing the efficiency by lowering the loss of the optical waveguide, by modifying the method for fabrication of the optical waveguide which is a fundamental constituent element of an optical harmonic generating device employing laser diode.

To achieve the above object, the manufacturing method of the frequency doubler of the invention comprises a step of forming a high refractive index layer by proton exchange, after forming a protective mask made of $Ta_2O_5$ on an $LiNb_xTa_{1-x}O_3$ ($0 \leq x \leq 1$) substrate, and a step of forming the incident portion for the fundamental wave.

In the optical waveguide which is a fundamental constituent element of the frequency doubler fabricated in such manner, since the mask is made of a stable oxide, diffusion into $LiNbO_3$ does not occur, and roughness of the mask edge derived from the photo process is less, and the loss of the waveguide is lowered, so that the conversion efficiency of the frequency doubler is notably enhanced.

DETAILED DESCRIPTION OF THE INVENTION

Figure 1A:
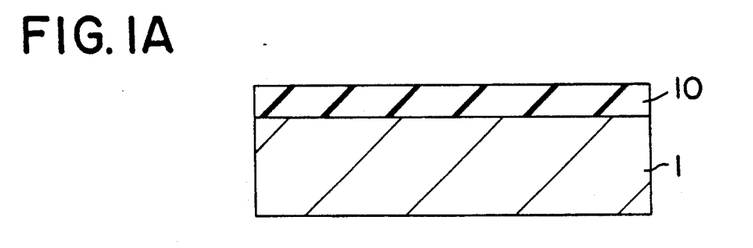
FIGS. 1A to 1C are manufacturing process sectional views of frequency doubler in an embodiment of the invention.
Figure 1B:
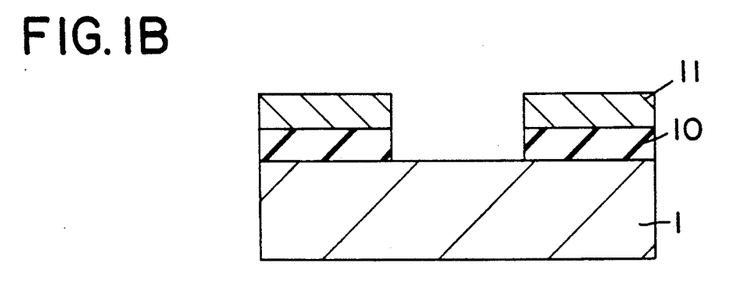
Figure 1C:
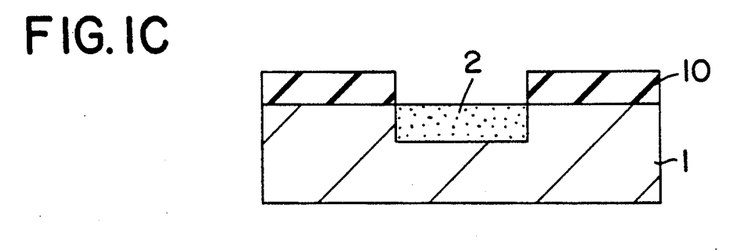

As one of the embodiments, a manufacturing method of the frequecy doubler of the invention is explained in the first place by referring to the drawings. To begin with, the method for fabrication of optical waveguide as a fundamental constituent element of this frequency doubler is explained. Manufacturing process drawings of the optical waveguide of the invention are shown in FIG. 1. In this embodiment, as the optical harmonic generating device, a proton exchanged optical waveguide fabricated on $LiNbO_3$ substrate is used, and in FIG. 1 numeral 1 is an $LiNbO_3$ substrate of $-Z$ board (the minus side of the substrate cut off vertically to the Z-axis). In FIG. 1A, a protective mask 10 of $Ta_2O_5$ was evaporated on the $LiNbO_3$ substrate 1 by 300 Å by sputtering.

In FIG. 1B, a 0.5 μm thick photoresist 11 was patterned on the protective mask 10 by ordinary photo process, and the protective mask 10 of $Ta_2O_5$ was dry-etched by $CF_4$. After removing the photoresist 11, in FIG. 1C, a 0.37 μm thick high refractive index layer 2 was formed on the LiNbO$_3$ substrate by heating for 5 minutes (proton exchange treatment) in pyrophosphoric acid at 230° C. which is a kind of phosphoric acid, and then the protective mask 10 was removed. This high refractive index layer 2 becomes the optical waveguide. Finally, the plane vertical to the optical waveguide 2 was polished The propagation loss of this waveguide was 0.6 dB/cm in the laser diode (wavelength 0.84 μm), which was greatly decreased as compared with 1.5 dB/cm of the Ta mask. When Ta or other metal is used as the protective mask, diffusion of Ta which is metal to the LiNbO$_3$ substrate occurs, and the loss of the guided wave occurs in this portion. By contrast, with the Ta$_2$O$_5$ which is a stable oxide used in the invention, diffusion does not occur and the loss is reduced. One of the other reasons for decreasing the loss is the decrease of roughness of the edge of the fabricated pattern. That is, the roughness of the edge of Ta pattern is ±300 Å, while that of the Ta$_2$O$_5$ pattern is about ±100 Å, which is extremely small. This is considered because the ultraviolet ray is reflected on the Ta surface to form stationary waves, thereby producing periodic undulations, when Ta is used in the exposure step of photo process.

Figure 2A:
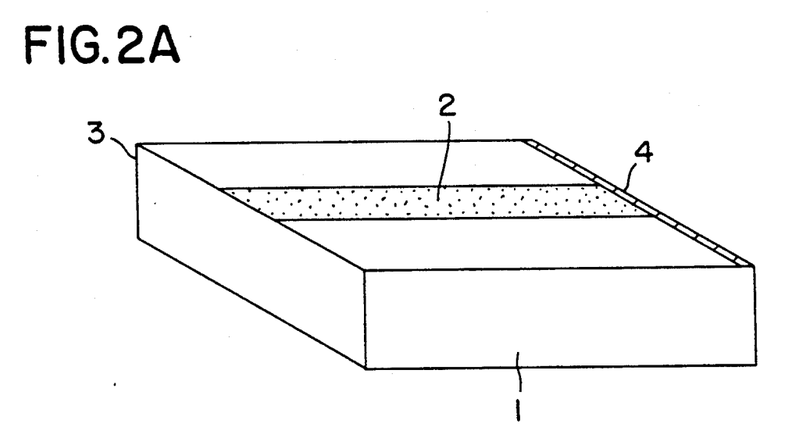
FIG. 2A is a structural perspective view of frequency double in an embodiment of the invention, 2B is a sectional view cut away from a plane parallel to an optical waveguide.
Figure 2B:
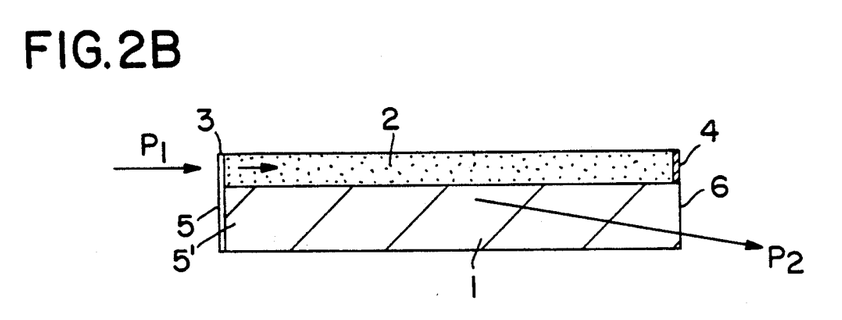

The manufacturing method of the frequency doubler of the invention using this optical waveguide is described in detail below. The structural drawing is shown in FIG. 2. Specifically, FIG. 2A is a perspective view of the frequency doubler, and FIG. 2B is a sectional view on a plane parallel to the optical waveguide. According to the fabricating method of the optical waveguide shown in FIG. 1, the optical waveguide as the fundamental element of the frequency doubler was fabricated. Numeral 2 is an optical waveguide formed by proton exchange treatment in phosphoric acid, 5 is an incident plane of fundamental wave P1, and 6 is an exit plane of generated harmonic fundamental wave. Afterwards, the exit portion of the fundamental wave to become the exit plane 6 is roughened by rough polishing so as to scatter the fundamental wave. Finally, the incident plane 5 is coated with an anti-reflection film (AR coat) against the fundamental wave, and the exit plane 6 with an AR coat against the harmonic wave, so that the frequency doubler is fabricated. The AR coat 5' of the incident plane 5 is to prevent returning light to the laser diode. The length of this fabricated device was 30 mm. The fundamental wave P1 focused by the focusing lens enters the optical waveguide 2 formed on the LiNbO$_3$ substrate 1 from the incident portion 3 of the incident plane 5. The laser light P1 entering from the incident portion 3 of the fundamental wave P1 is converted into harmonic wave P2 inside the optical waveguide 2, and is emitted into the LiNbO$_3$ substrate 1. The majority of the fundamental wave being propagated without being converted into the harmonic wave P2 is scattered by the exit portion 4. Accordingly, the fundamental wave does not return to the laser diode, and hence the output and longitudinal mode of the laser diode may be stable. Accordingly, the output of the harmonic wave becomes also stable. As the fundamental wave P1, when laser diode light (wavelength 0.84 um) was guided from the incident portion 3, it was propagated in single mode at the optical waveguide width of 2 um, and harmonic wave P2 of wavelength 0.42 μm was taken out of the substrate from the exit plane 6. By the input of fundamental wave of 40 mW, a harmonic wave of 1.6 mW (wavelength 0.42 μm) was obtained. This is because Ta$_2$O$_5$ was used as the protective mask, and the transmission loss of the optical waveguide was notably reduced, thereby making it possible to extend the length of the optical harmonic generating device, so that the conversion efficiency could be enhanced Besides, since the reflected light could be notably decreased, the laser diode operated stably, and the fluctuations of harmonic wave ouptut were within ±3%.

Incidentally, in multimode propagation against fundamental wave, the output of harmonic wave is unstable and it is not practicable. It is therefore necessary to set the protective mask width to 2.5 μm or less. Besides, using the fundamental waves with wavelength of 0.70 to 1.6 μm, generation of harmonic waves by this frequency doubler was confirmed. Meanwhile, the propagation loss was particularly small when the +Z or −Z plane of the substrate was used as in this embodiment.

Figure 3A:
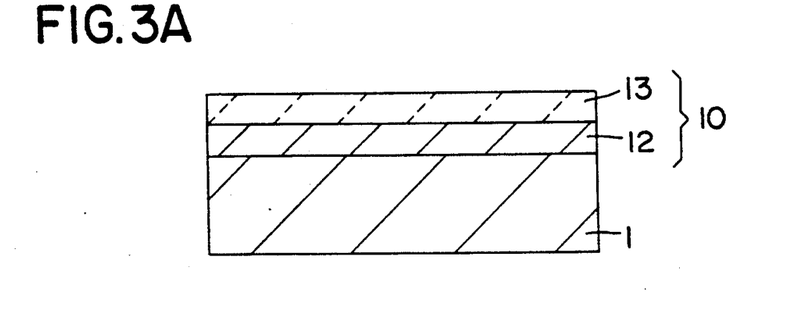
FIGS. 3A to 3D are manufacturing process drawings of frequency doubler of an embodiment of the invention.
Figure 3B:
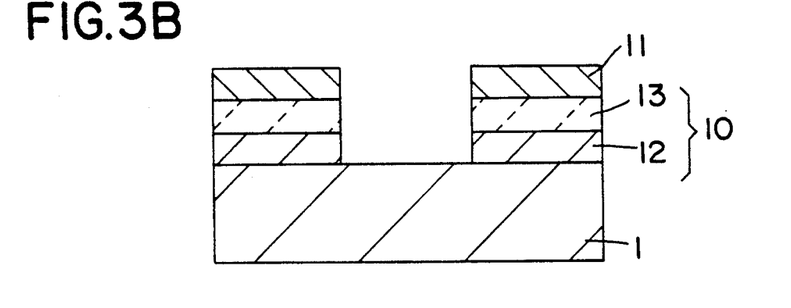
Figure 3C:
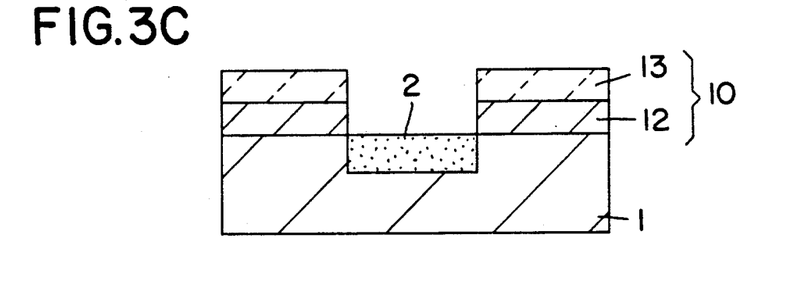
Figure 3D:
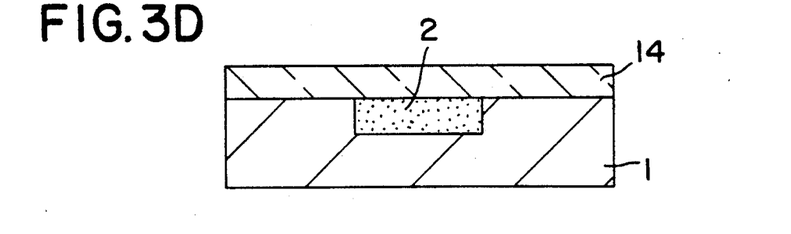

Next is explained a second embodiment of the manufacturing method of the frequency doubler fabricated by the manufacturing method of the invention. The manufacturing process drawings of the frequency doubler are shown in FIG. 3. In FIG. 3A, a Ta$_2$O$_5$ film was evaporated by 200 Å on an MgO-doped LiNbO$_3$ substrate, and then a Ta film 13 by 150 Å, both by sputtering. As the protective mask 10, when Ta$_2$O$_5$ is used, it may be exchanged with proton by passing through the mask at the time of proton exchange treatment, but it may be prevented completely if a double mask with Ta is formed In FIG. 3B, after patterning a 0.7 μm thick photoresist 11, the protective mask 10 was dry-etched by using C$_3$F$_8$ gas, and a slit was formed. After removing the photoresist 11, in FIG. 3C, heat treatment (proton exchange treatment) was conducted for 9 minutes, at 230° C., in pyrophosphoric acid which is a kind of phosphoric acid, and a 0.37 μm thick optical waveguide 2 was formed on the LiNbO substrate 1. Afterwards, in FIG. 3D, the protective mask 10 was removed. To remove the Ta film 13, sodium hydroxide and hydrogen peroxide water were used, and hydrogen fluoride was used for removal of Ta$_2$O$_5$ 12. By sputtering after removal, an SiO$_2$ film 14 was evaporated on the surface as protective film. Finally, by polishing the plane vertical to the optical waveguide 2, the same AR coat as in the first embodiment was applied, and the exit end of the fundamental wave was cut off. As a result, a frequency doubler was manufactured. The length of this device was 25 mm.

Figure 4:
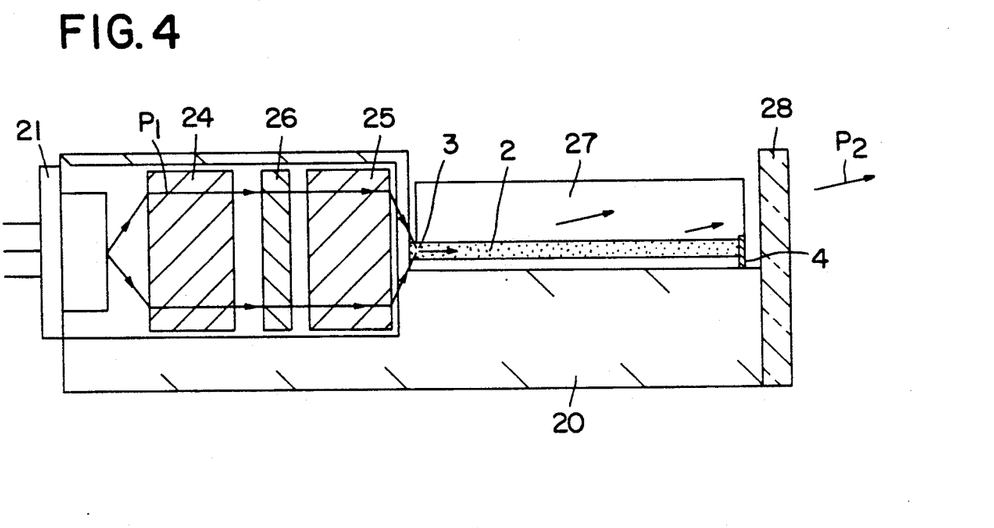
FIG. 4 is a structural sectional view of a short wavelength laser source in a second embodiment of the invention.

FIG. 4 shows the structure of the blue laser source which is a kind of short wavelength laser source composed by using the frequency doubler. In its manufacturing method, in the first place, the side of an optical harmonic generating device 27 forming the optical waveguide 2 was brought to contact with a mount 20. Next, a focusing lens 35 and a half wavelength plate 26 were inserted and fixed in the mount 20. After inserting a collimator lens 24 and a semiconductor laser 21, the semiconductor laser 21 was driven, and the collimator lens 24 and laser diode 21 were moved so that the fundamental wave P1 could be focused on the incident portion 3 of the optical harmonic generating device 27, and were fixed. In consequence, an absorption filter 28 of the fundamental wave was attached to the mount 20. In FIG. 4, the laser diode 21 has an oscillation wavelength of 0.78 μm, and a constant current is applied from a CW power source, and a sinusoidal harmonic wave (600 MHz) is applied from a harmonic wave superposing circuit, and a fundamental wave P1 of mean power of 50 mW is emitted. This fundamental wave P1 enters the optical harmonic generating device 27 through the lenses 24, 25 and half wavelength plate 26, and a harmonic wave P2 is generated. The half wavelength plate 26 is inserted in order to match the polarizing directions of the laser diode 21 and the optical waveguide 2 formed in the optical harmonic generating device 27. The exit portion 4 of the optical waveguide 2 is roughed by a file so as to scatter the fundamental wave P1. In this frequency doubler, a harmonic wave P2 of 1 mW was obtained, and the conversion efficiency was 2%. The stability of harmonic wave was within ±1%. In this embodiment, since an MgO-doped substrate was used, optical damage due to light of short wavelength can be prevented, and output fluctuations of the harmonic wave are small. Meanwhile, as for the $Ta_2O_5$ used in the foregoing embodiment, the rate of mixing of Ta and oxygen is not particularly specified.

Figure 5:
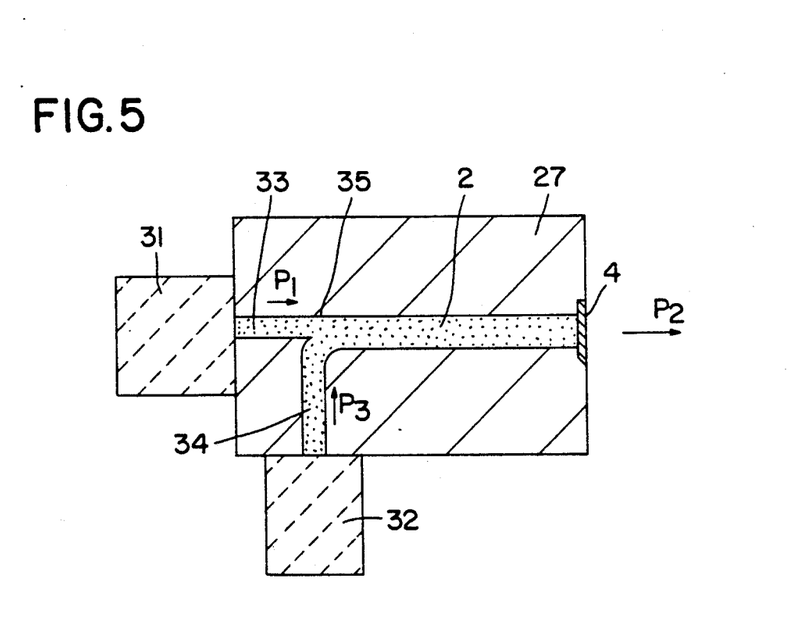
FIG. 5 is a structural constituent drawing of the short wavelength laser source of the embodiment of the invention.

As a third embodiment, another manufacturing method of the frequency doubler of the invention is explained below. This example relates to an application into fabrication of frequency doubler for executing sum frequency generation, by using the laser diode with wavelength of 1.3 μm of the fundamental wave and the laser diode with wavelength of 0.8 μm. In FIG. 5, numeral 31 denotes a laser diode with wavelength of 1.3 um, 32 is a laser diode with wavelength of 0.86 um, and 27 is an optical harmonic generating device. The optical harmonic generating device 27 comprises an optical waveguide 2 made of high refractive index layer, incident waveguides 33, 34, and Y-branch 35. This high refractive index layer was treated by proton exchange, using a protective mask made of $Ta_2O_5$, in order to decrease the loss. In this embodiment, the individual laser diodes are directly coupled to the optical harmonic generating device. That is, lenses are not used in coupling. The fundamental waves P1, P3 propagating through the incident waveguides 33, 34 meet together at the Y-branch 35, and enter the optical waveguide 2 to be converted into a sum frequency P2 (wavelength 0.52 μm) to be emitted. The fundamental waves P1, P3 propagating through the optical waveguide 2 and reaching the end are scattered at the exit portion 4, and therefore no light returns to the laser diodes, so that the operation may be stable. The exit portion 4 was processed by $CO_2$ laser so that the fundamental waves maybe scattered. By superposing harmonic waves respectively on the laser diodes 31, 32, the sum frequency P2 was further stabilized. At the length of the optical harmonic generating device of 20 mm, and by the fundamental waves P1 of 40 mW and P3 of 20 mW for guiding in the optical waveguide 2, a sum frequency P2 (wavelength 0.52 μm) of 0.5 mW was obtained. Thus, this manufacturing method is effective also when applied in the frequency doubler capable of generating sum frequency because the propagation loss can be reduced and the output may be enhanced. Especially, as in this embodiment, it is effective when the propagation loss can be reduced not only in the optical waveguide, but also in the incident waveguide and Y-branch or the like.

As a fourth embodiment, below is explained the fabrication of the optical waveguide into the Nd-doped LiNbO substrate as the manufacturing method of the frequency doubler of the invention. In this embodiment, an $LiNbO_3$ substrate doped with Nd and MgO was used as the substrate. On this substrate, a pattern was formed by using $Ta_2O_5$ film as protective mask, and proton exchange was effected by using phosphoric acid, and a high refractive index layer was formed. Afterward, the light incidence and exit planes were polished, and the light was caused to enter the high refractive index layer, that is, the optical waveguide. When YAG laser (wavelength 1.06 μm) was caused to enter the optical waveguide of 2 μm in width and 0.6 μm in thickness, the loss was notably lowered (0.8 dB/cm) as compared with the optical waveguide (propagation loss 2 dB/cm) fabricated by using Ta mask. As a result, the efficiency of the frequency doubler could be enhanced.

As a fifth embodiment, the following explanation relates to the application of the short wavelength laser source incorporating the optical harmonic generating device fabricated by this method into reading of optical disk. In this example, too, $Ta_2O_5$ was used as the protective mask when fabricating the optical waveguide. The harmonic wave obtained by this short wavelength laser source was shaped by a shaping lens so that the scattering side might be parallel light, thereby making parallel light on both sides. This parallel harmonic wave passes through a polarizing beam splitter, and forms a spot of 0.6 μm on the optical disk after being focused by a focusing lens. This reflected signal passes again through the polarizing beam splitter, and enters a detector. Using a laser diode of wavelength of 0.84 μm and output of 60 mW, a harmonic wave of 1.4 mW was emitted.

Thus, by using the frequency doubler fabricated by the invention, the output may be enhanced, and it may be used in reading of optical disk. As a result, as compared with the conventional reading system of the optical disk using the laser diode of 0.8 μm band, the spot may be reduced to half, and the recording density of the optical disk may be improved four times.

In the foregoing embodiments, meanwhile, the optical waveguide and Y-branch were fabricated by the manufacturing method of the invention, but this manufacturing method is also effective in other parts, such as the directivity coupler and waveguide shape lens, as far as the devices are guided by light. Besides, the fundamental wave was scattered at the exit portion, but it is also effective to absorb the fundamental wave by applying an absoring material on the exit portion. Meanwhile, the LiNbO large in the nonlinear optical constant was used in these embodiments, but any substrates large in the nonlinear optical constant such as $LiTaO_3$ and $KNbO_3$ may be equally employed. Incidentally, if the film quality of the $Ta_2O_5$ used as the mask is excellent, deviation of composition or entry of foreign matter will not matter.

Thus, according to the manufacturing method of the frequency doubler of the invention, by modifying the manufacturing method of the optical waveguide as the fundamental constituent element and using $Ta_2O_5$ as the mask, the propagation loss of the optical waveguide is notably decreased, and a high efficiency is realized. Moreover, by using the short wavelength laser light source incorporating the frequency doubler manufactured by this method, harmonic wave or sum frequency of high output will be generated.

We claim:
1. A method for manufacturing a frequency doubler comprising the steps of:
   a. forming $Ta_2O_5$ film on an $LiNb_xTa_{l-x}O_3 (0 \leq x \leq 1)$ substrate;
   b. forming an opening region of said $Ta_2O_5$ film by dry etching;
   c. forming a high refractive index layer in the surface of said $LiNb_xTa_{l-x}O_3$ substrate and under the open- ing region of said $Ta_2O_5$ film by proton exchange using said $Ta_2O_3$ film as a protective mask; and d. forming an incident portion for fundamental waves 2. The manufacturing method of frequency doubler according to claim 1, which also comprises a step for forming an anti-reflection film at the incident portion of the fundamental waves.

3. The manufacturing method of frequency doubler according to claim 1, wherein the $LiNb_xTa_{1-x}O_3$ ($0 \leq x \leq 1$) substrate doped with MgO or Nd is used.

4. The manufacturing method of frequency doubler according to claim 1, wherein the $LiNb_xTa_{1-x}O_3$ ($0 \leq x \leq 1$) substrate of $+Z$ or $-Z$ board is used.

5. The manufacturing method of frequency doubler according to claim 1, wherein proton exchange is effected by using an acid mainly composed of phosphoric acid.

6. The manufacturing method of frequency doubler according to claim 1, wherein $Ta_2O_5$ and Ta formed on said $Ta_2O_5$ are used as protective mask.

7. The manufacturing method of frequency doubler according to claim 1, wherein the protective mask made of $Ta_2O_5$ is formed by dry etching by $CF_4$.

8. The manufacturing method of frequency doubler according to claim 1, wherein the protective mask width is 2.5 μm or less.

9. The manufacturing method of frequency doubler according to claim 1, which also comprises a step for processing so as to scatter or absorb the fundamental wave from the laser diode at the exit portion of the optical waveguide.

* * * * *